(12) United States Patent
Barton et al.

(10) Patent No.: US 11,396,154 B2
(45) Date of Patent: Jul. 26, 2022

(54) MODULAR WIND TURBINE BLADE AND ASSOCIATED METHOD OF MANUFACTURE

(71) Applicant: Vestas Wind Systems A/S, Aarhus N. (DK)

(72) Inventors: Leon Barton, Newport (GB); Robert Hunter, Cowes (GB); Christopher Owens, Wales (GB)

(73) Assignee: Vestas Wind Systems A/S, Aarhus N (DK)

( * ) Notice: Subject to any disclaimer, the term of this patent is extended or adjusted under 35 U.S.C. 154(b) by 185 days.

(21) Appl. No.: 16/955,348

(22) PCT Filed: Dec. 18, 2018

(86) PCT No.: PCT/DK2018/050373
§ 371 (c)(1),
(2) Date: Jun. 18, 2020

(87) PCT Pub. No.: WO2019/120417
PCT Pub. Date: Jun. 27, 2019

(65) Prior Publication Data
US 2021/0086463 A1 Mar. 25, 2021

(30) Foreign Application Priority Data
Dec. 21, 2017 (DK) .......................... PA 2017 70973

(51) Int. Cl.
*B29D 99/00* (2010.01)
*B29C 65/48* (2006.01)
(Continued)

(52) U.S. Cl.
CPC ...... *B29D 99/0028* (2013.01); *B29C 65/4835* (2013.01); *B29C 65/542* (2013.01);
(Continued)

(58) Field of Classification Search
CPC ........... B29D 99/0028; B29L 2031/085; B29C 66/1162; B29C 66/54; B29C 65/7826
See application file for complete search history.

(56) References Cited

U.S. PATENT DOCUMENTS 6,638,466 B1 10/2003 Abbott
9,050,786 B2 * 6/2015 Fredskild .............. B29C 70/304
(Continued)

FOREIGN PATENT DOCUMENTS

DE 102012109748 A1 4/2013
GB 2477847 A 8/2011
(Continued)

OTHER PUBLICATIONS

Danish Patent and Trademark Office Search and Examination Report in PA 2017 70973, dated May 24, 2018.
(Continued)

*Primary Examiner* — Carson Gross
(74) *Attorney, Agent, or Firm* — Wood Herron & Evans LLP

(57) ABSTRACT

A method of making a modular wind turbine blade is described. The modular blade comprises first and second blade modules connected together by a scarf joint between tapered spar caps of the respective blade modules. According to the method, first and second blade modules are laid up in the same mould assembly. A separating layer is arranged between the layups of the first and second module in a joint region of the mould. The separating layer has a thickness corresponding to a required bond thickness in the scarf joint when the modules are bonded together.

20 Claims, 11 Drawing Sheets

(51) Int. Cl.
  *B29C 65/54* (2006.01)
  *B29C 65/78* (2006.01)
  *B29C 65/00* (2006.01)
  *B29C 70/84* (2006.01)
  *B29L 31/08* (2006.01)

(52) U.S. Cl.
  CPC .... *B29C 65/7826* (2013.01); *B29C 66/02242* (2013.01); *B29C 66/54* (2013.01); *B29C 66/721* (2013.01); *B29C 70/84* (2013.01); *B29C 66/1162* (2013.01); *B29L 2031/085* (2013.01)

(56) References Cited

U.S. PATENT DOCUMENTS

2010/0132884 A1* 6/2010 Baehmann .......... B29C 66/1142
                                                       156/423
2014/0260849 A1   9/2014 Johnson et al.

FOREIGN PATENT DOCUMENTS

WO    2004015265 A1   2/2004
WO    2016198075 A1  12/2016

OTHER PUBLICATIONS

European Patent Office, International Search Report and Written Opinion in PCT Application No. PCT/DK2018/050373, dated Mar. 29, 2019.

* cited by examiner

MODULAR WIND TURBINE BLADE AND ASSOCIATED METHOD OF MANUFACTURE

TECHNICAL FIELD

The present invention relates generally to modular wind turbine blades and to a method of manufacturing a modular wind turbine blade.

BACKGROUND

There is a continuing desire to generate increased levels of power from wind power production facilities such as on-shore and off-shore wind farms. One way to achieve this is to manufacture modern wind turbines with larger blades. The provision of larger blades increases the swept area of the rotor, allowing the wind turbine to capture more energy from the wind.

Transportation of large components, in particular long rotor blades, can be problematic as a wind farm site may be remote and difficult to access. To resolve this problem, the rotor blades may be designed as a modular assembly. A turbine blade may be divided into two or more modules that are easier to transport and which are then assembled on site by adhesively bonding the modules together.

One of the key challenges associated with modular wind turbine blades is ensuring that the blade modules are precisely aligned before they are bonded together. Ensuring precise alignment between blade modules can be difficult when assembling the blade in the field, and if the modules are not precisely aligned then this can reduce the strength of the blade across the bonded joint between the blade modules.

Another key challenge is ensuring that the blade is sufficiently strong across the bonded joint between the blade modules. A high-quality bond is required to achieve predictable and consistent structural performance of the blade in accordance with the design specification. Ideally a consistent bond thickness should be maintained throughout a joint region between blade modules. However, when assembling very large blade modules in the field, it can be difficult to control the bond thickness between the modules.

It is against this background that the present invention has been developed.

SUMMARY OF INVENTION

In a first aspect of the present invention there is provided a method of making first and second blade modules of a modular wind turbine blade, the first and second blade modules each having a spar cap section with a tapered end, and the modules being configured for connection end-to-end by an adhesively bonded scarf joint between the tapered end portions of respective spar cap sections of the blade modules.

The method comprises: providing a blade mould having a first region, a second region and a joint region between the first and second regions; arranging a first outer skin layer of fibrous material in the first region of the mould and in the joint region of the mould to form an outer skin of the first blade module; arranging a first spar cap section having a tapered end portion on top of the first outer skin layer such that the tapered end portion is in the joint region of the mould and a remainder of the first spar cap section extends into the first region of the mould; arranging a first separating layer on top of the tapered end portion of the first spar cap section in the joint region of the mould; arranging a second outer skin layer of fibrous material in the second region of the mould to form an outer skin of the second blade module; arranging a second spar cap section having a tapered end portion in the mould such that its tapered end portion overlaps the tapered end portion of the first spar cap section in the joint region of the mould with the first separating layer sandwiched there between, and such that a remainder of the second spar cap section extends into the second region of the mould and is on top of the second outer skin layer; integrating the first outer skin layer with the first spar cap section to form a shell portion of the first blade module; integrating the second outer skin layer with the second spar cap section to form a shell portion of the second blade module; separating the shell portions of the first and second blade modules; and selecting a thickness of the first separating layer to correspond to a required bond thickness of the scarf joint between the tapered end portions of the first and second spar cap sections when the first and second modules are connected together to form the modular blade.

The method may further comprise arranging part of the second outer skin layer around the tapered end portion of the first spar cap section in the joint region of the mould.

The method may further comprise arranging a second separating layer such that it overlaps an edge portion of the first outer skin layer in the joint region of the mould, and wherein the second outer skin layer extends up to or overlaps the second separating layer.

The first separating layer may be elongate and extend in a spanwise direction of the mould. The second separating layer may be elongate and extend in a chordwise direction of the mould. The second separating layer may be integral with the first separating layer or it may be a separate layer.

The method may further comprise arranging first core material in the mould on top of the first outer skin layer. A third separating layer may be arranged in the joint region of the mould such that it covers an end face of the first core material. The third separating layer may be integral with the second separating layer and/or integral with the first separating layer. The third separating layer may form a step with the second separating layer. Alternatively, the third separating layer may be a separate layer.

The method may further comprise arranging second core material in the mould on top of the second outer skin layer. An end face of the second core material may abut the third separating layer.

The method may further comprise arranging a first inner skin layer of fibrous material on top of the first spar cap section to form an inner skin of the first blade module. A fourth separating layer may be arranged in the mould such that it overlaps an edge portion of the first inner skin layer. The method may further comprise arranging a second inner skin layer of fibrous material on top of the second spar cap section to form an inner skin of the second blade module. The second inner skin layer may extend up to or overlap the fourth separating layer. The fourth separating layer may be integral with the first and/or second and/or third separating layers. Alternatively, the fourth separating layer may be a separate layer.

The method may further comprise arranging peel ply in the mould in areas directly above and/or below the or each separating layer. The or each separating layer may be made from a non-stick material such as silicone, PTFE or equivalent. Indeed, any suitable material which perform the objective of the separating layer described herein may be used. The or each separating layer may comprise perforations.

The first and/or second spar cap sections preferably comprise at least two parallel spaced-apart beams.

BRIEF DESCRIPTION OF DRAWINGS

The present invention will now be described in further detail by way of non-limiting examples with reference to the following figures, in which;

FIGS. 7 to 10 schematically illustrate a lay-up procedure for manufacturing half shells of the first and second blade modules, in which:

FIG. 10a schematically shows a pair of second spar cap sections with tapered end portions arranged on top of the tapered end portions of the first spar cap sections with the separating layer sandwiched there between;

DETAILED DESCRIPTION

Figure 1:
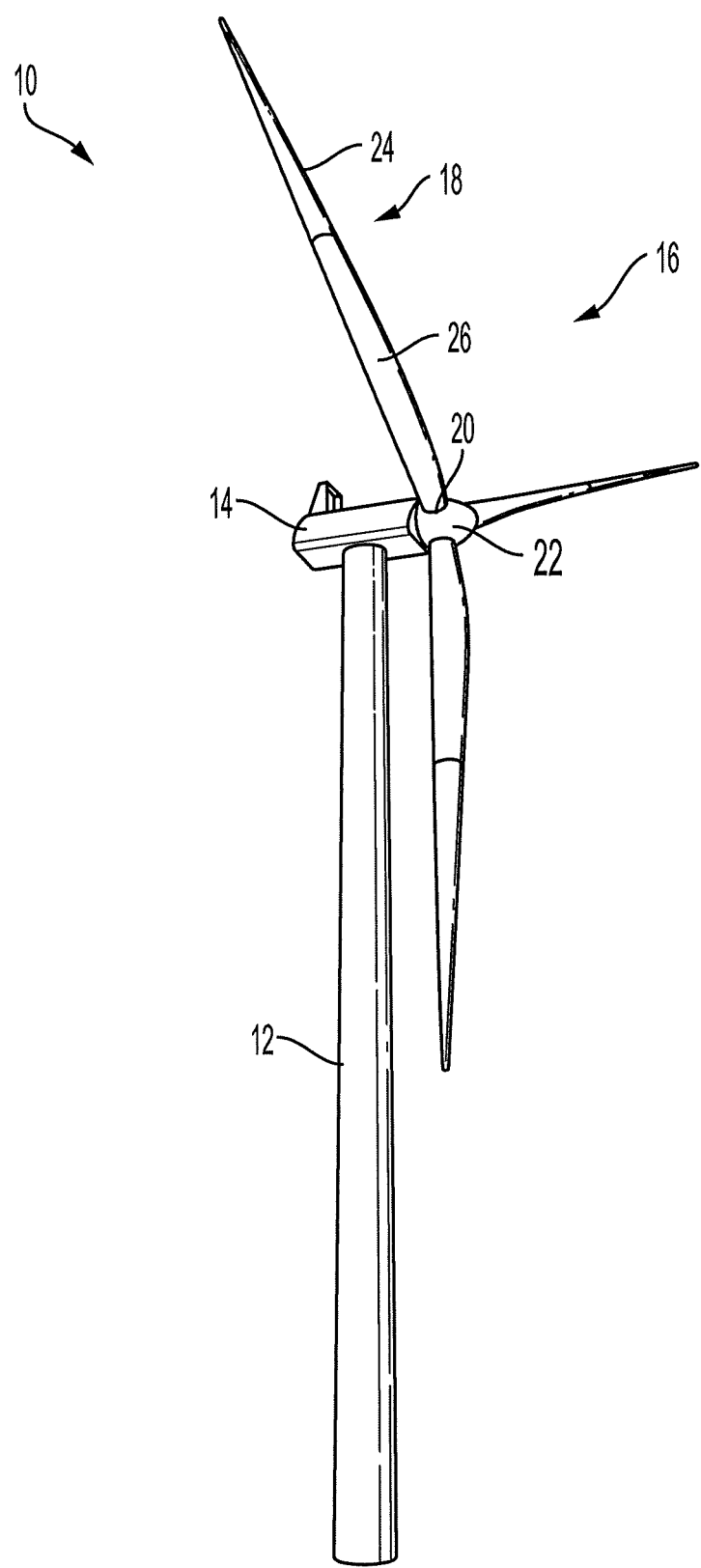
FIG. 1 is a schematic representation of a modern utility-scale wind turbine with modular blades.

FIG. 1 is a schematic representation of a modern utility-scale wind turbine 10 in accordance with an embodiment of the present invention. The wind turbine 10 comprises a tower 12 supporting a nacelle 14. A rotor 16 is mounted to the nacelle 14. The rotor 16 comprises a plurality of radially extending wind turbine blades 18 which are attached at their respective root ends 20 to a central hub 22. In this example, the rotor 16 comprises three blades 18, but in other embodiments the rotor 16 may have any number of blades 18. The wind turbine blades 18 in this example comprise first and second blade modules, 24, 26 though more than two modules per blade 18 may be used in other embodiments. As explained by way of background, the modular blade components may be assembled at the wind farm site to facilitate easier transportation of large components.

Figure 2:
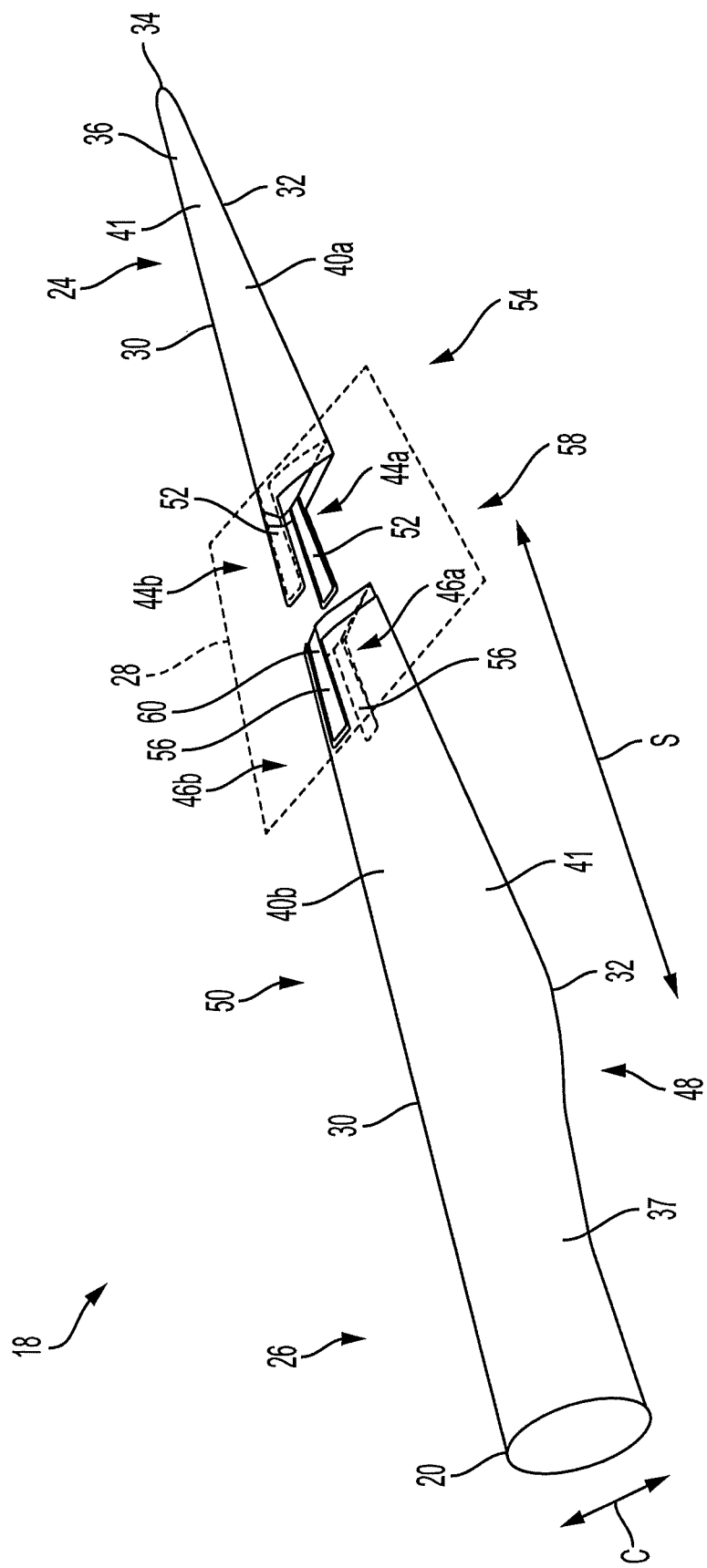
FIG. 2 is a schematic exploded view of a modular wind turbine blade comprising a first blade module having projecting tapered spar cap sections and a second blade module having external tapered recesses for accommodating the projecting tapered spar cap sections of the first blade module.

Referring to FIG. 2, this shows a schematic exploded view of a modular wind turbine blade 18 according to a first embodiment of the present invention. The modular wind turbine blade 18 comprises first and second blade modules 24, 26. The blade modules 24, 26 are configured to be connected end-to-end in a joint region 28 to form the complete wind turbine blade 18.

In FIG. 2, the axes S and C indicate spanwise and chordwise directions respectively of the modular blade 18 and of each blade module 24, 26. The first and second blade modules 24, 26 form spanwise (S) sections of the modular wind turbine blade 18. Each module extends in the chordwise direction between a leading edge 30 and a trailing edge 32.

In the embodiment shown, the first blade module 24 includes a tip 34 of the blade 18 and the second blade module 26 includes a root 20 of the blade. In other embodiments, the first module 24 may comprise a root 20 of the blade and the second module 26 may comprise a tip 34 of the blade. Further, in other embodiments the modular blade 18 may include more than two modules, for example additional modules may be connected inboard or outboard of the first and/or second blade module 24, 26 and these further modules may include the blade root 20 and/or the blade tip 34.

Figure 3A:
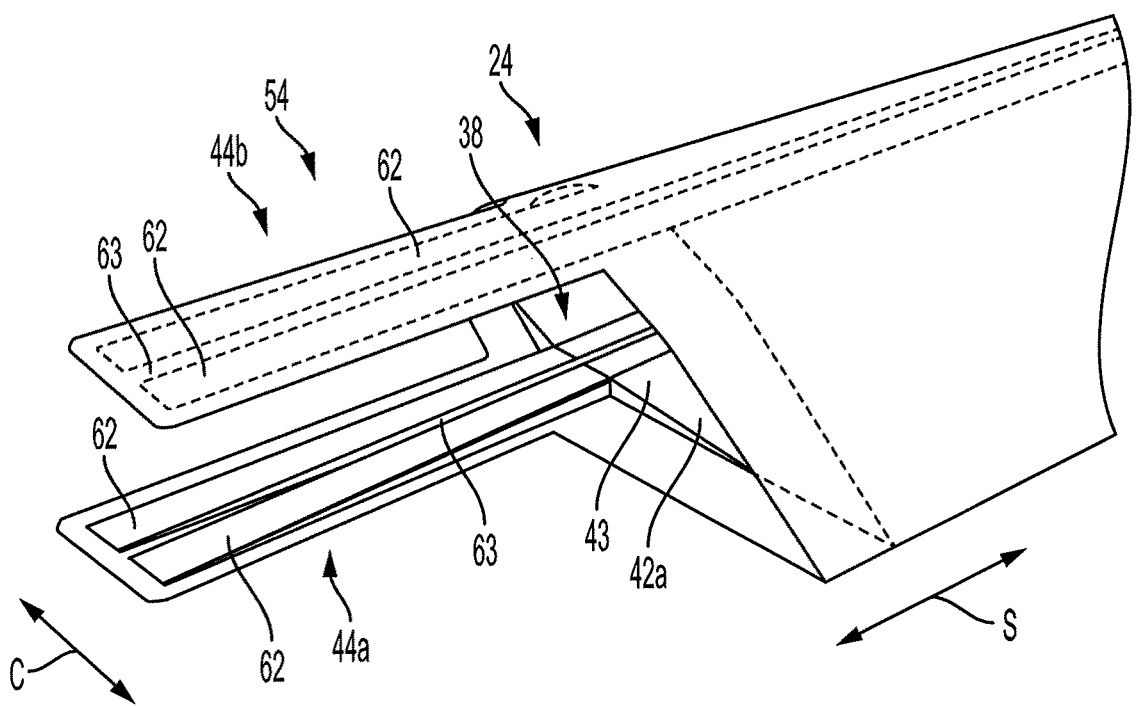
FIG. 3a is a schematic view of a joint end of a first blade module.
Figure 3B:
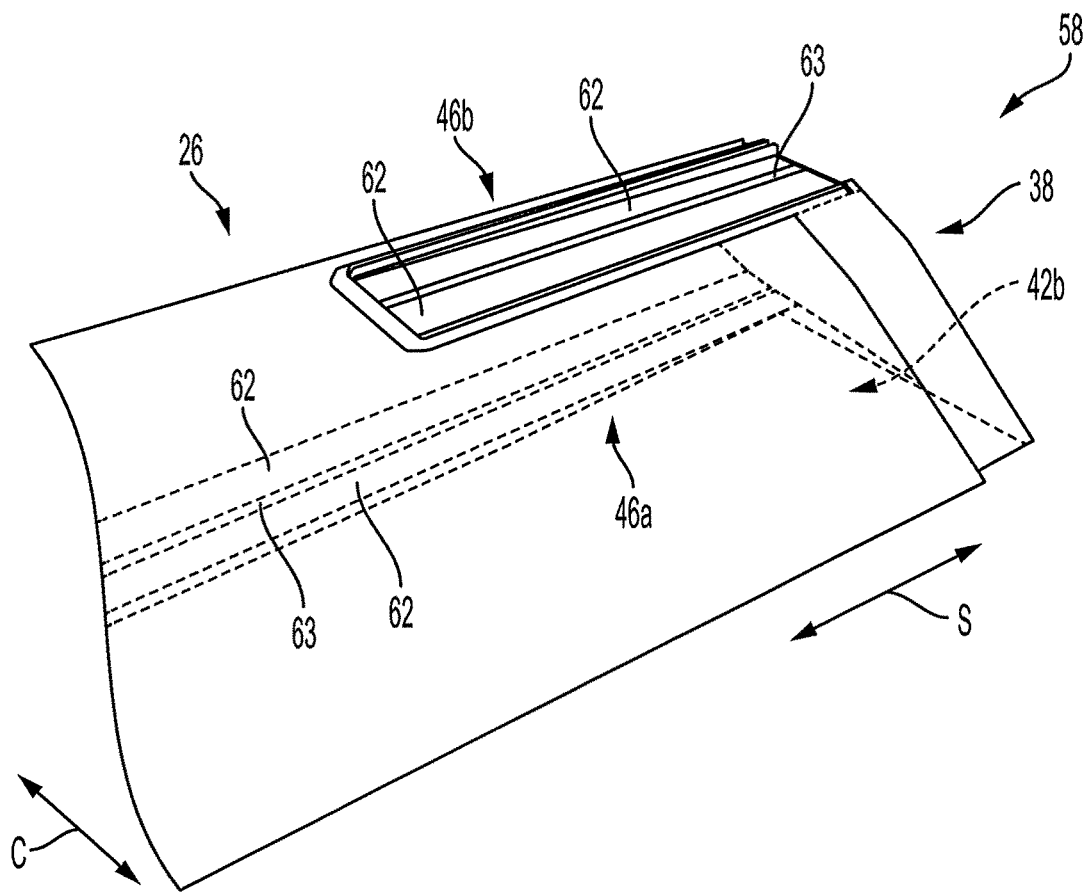
FIG. 3b is a schematic view of a joint end of a second blade module.

Each blade module 24, 26 comprises an outer shell 36, 37 defining a generally hollow interior 38 (shown in FIGS. 3a, 3b). In this example, the outer shells 36, 37 are formed primarily from glass-fibre-reinforced plastic (GFRP). The outer shells 36, 37 have a laminate structure comprising an outer skin 40a, 40b defining an outer surface 41 of the blade 18 and an optional inner skin 42a, 42b (shown in FIGS. 3a, 3b) defining an interior surface 43 (shown in FIGS. 3a, 3b) of the blade 18. The inner and outer skins 42a, 42b and 40a, 40b each comprise one or more layers of fibrous material embedded in a cured matrix material, such as epoxy resin. Lightweight core material, such as foam panels may be provided between the inner and outer skins 42a, 42b and 40a, 40b in regions of the blade shells 36, 37 where increased stiffness is required.

Each module 24, 26 includes a longitudinally-extending spar structure that absorbs bending loading of the blade 18. In the present embodiment, the spar structure comprises mutually opposed spar cap sections 44a, 44b and 46a, 46b arranged respectively on a windward side 48 and a leeward side 50 of each module 24, 26. A shear web (not shown) may be arranged between the opposed spar cap sections 44a, 44b and 46a, 46b. The spar cap sections in this embodiment are embedded within the shell structure of the blade modules 24, 26, between the inner and outer skins 42a, 42b and 40a, 40b.

The first blade module 24 includes a pair of first spar cap sections 44a, 44b having tapered end portions 52. The tapered end portions 52 project in the spanwise direction S from the aerodynamic shell of the first blade module 24 at a joint end 54 (in this case an inboard end) of the first blade module 24. The second blade module 26 includes a pair of tapered recesses 56 at a joint end 58 (in this case an outboard end) of the second blade module 26. The tapered recesses 56 are formed by tapered end portions 60 of a pair of second spar cap sections 46a, 46b of the second blade module 26. In this example, the tapered recesses 56 are external recesses defined in the outer surface 41 of the shell 37 of the second blade module 26.

The first spar cap sections 44a, 44b taper in thickness in an opposite sense to the second spar cap sections 46a, 46b in the spanwise direction S. When the blade 18 is assembled, the tapered ends 52 of the first spar cap sections 44a, 44b are bonded in the tapered recesses 56 to form adhesively bonded scarf joints between the first and second spar cap sections 44a, 44b and 46a, 46b. Any suitable adhesive may be used, for example a film adhesive or paste adhesive. Alternatively, a local infusion may be used, as described in further detail later with reference to FIGS. 4a and 4b.

The design of the blade modules 24, 26 of the present invention facilitates assembly of the modular wind turbine blade 18 on site. In particular, the tapered recesses 56 in one blade module 26 precisely locate the projecting spar caps 44a, 44b of the other module 24 and ensure precise alignment between the modules 24, 26 without the need for complicated and expensive alignment tooling. The tapered end portions 52, 60 of the spar caps 44a, 44b and 46a, 46b provide a large bond area and hence a strong joint can be formed between the modules 24, 26. Further details of the blade modules 24, 26 and the assembly process will now be described with reference to FIGS. 3 to 5.

FIGS. 3a and 3b show more detailed schematic views of the joint ends 54, 58 of the first and second blade modules 24, 26. As shown in FIGS. 3a and 3b, the spar cap sections 44a, 44b, 46a, 46b of each module 24, 26 may comprise a plurality of parallel side-by-side beams 62. In this example, the spar cap sections 44a, 44b, 46a, 46b comprise two side-by-side beams 62. The beams 62 are slightly spaced apart in the chordwise direction C, for example by approximately 5 mm. The space 63 between the beams 62 is preferably filled with resin. In other examples the spar cap sections 44a, 44b, 46a, 46b may comprise a single beam 62 or more than two side-by-side beams 62. The beams 62 may be formed from a stack of strips of reinforcing material, for example carbon fibre reinforced plastic (CFRP). The strips are preferably formed by pultrusion.

Figure 4A:
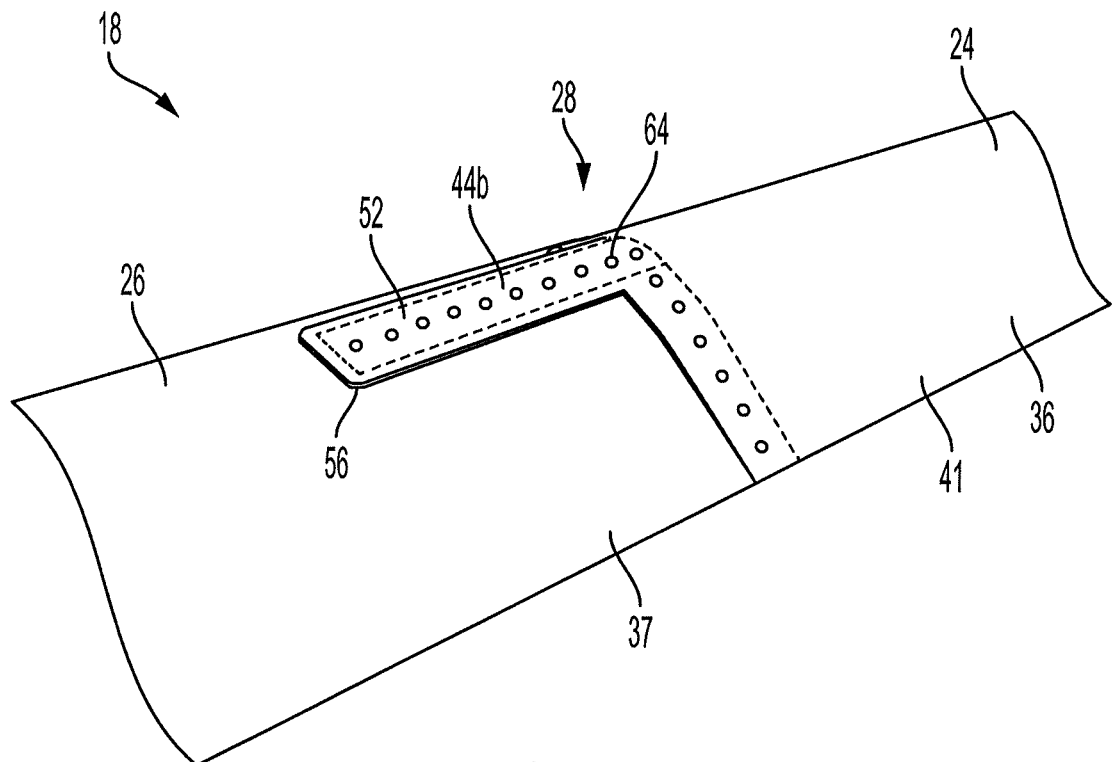
FIGS. 4a and 4b show an assembled modular blade before and after application of a bonding adhesive respectively.
Figure 4B:
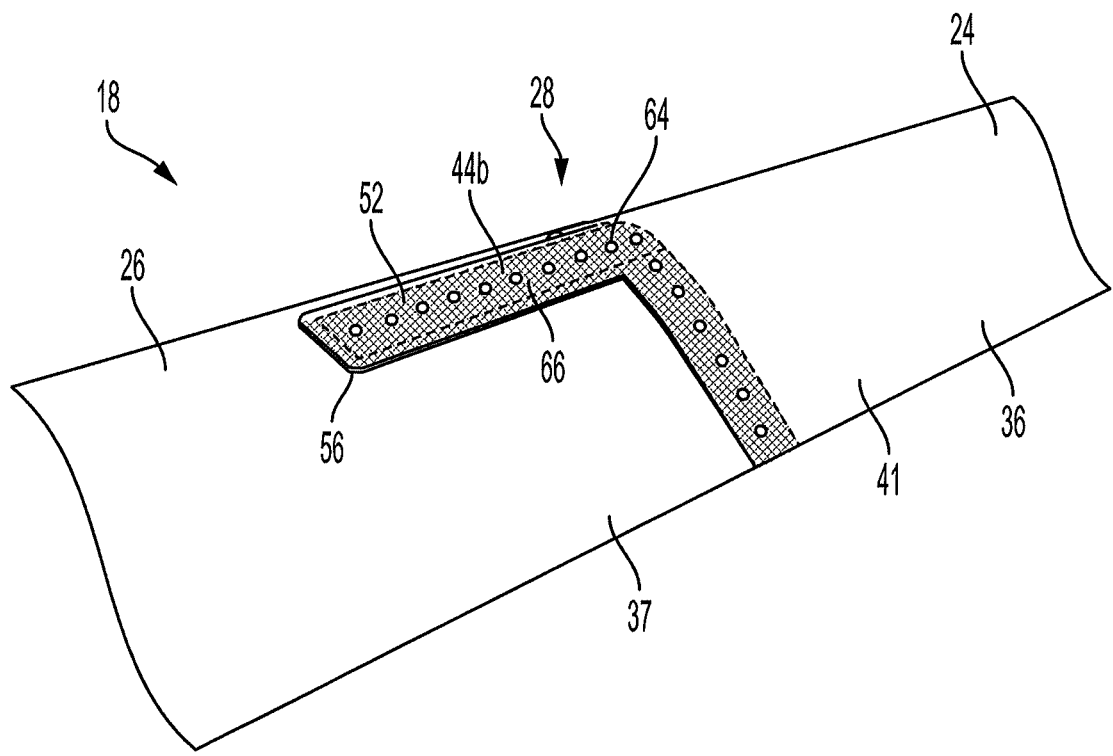

FIGS. 4a and 4b show the joint region 28 of the modular blade 18 when the first and second modules 24, 26 are assembled. Referring to FIG. 4a, this shows the first and second blade modules 24, 26 correctly aligned and positioned before the bonding process. In particular, the tapered ends 52 of the first spar cap sections 44a, 44b of the first module 24 are received within the tapered recesses 56 in the second blade module 26. Holes 64 are provided, e.g. drilled, in the outer shell 36a of the first blade module 24 in the joint region 28. The holes 64 may be provided through the spaces 63 between the parallel beams 62 of the first spar cap sections 44a, 44b (shown in FIGS. 3a and 3b). Providing the holes 64 in this location advantageously avoids the need to drill through the beams 62.

Adhesive 66 may then be injected through these holes 64 to bond the two modules 24, 26 together. The shading in FIG. 4b indicates the location of the adhesive 66 in the joint region 28. After injection, the adhesive 66 is then cured either by the ambient temperature or for example by employing heater pads at the surface 41 of the blade 18 dependent on the adhesive used.

Figure 5:
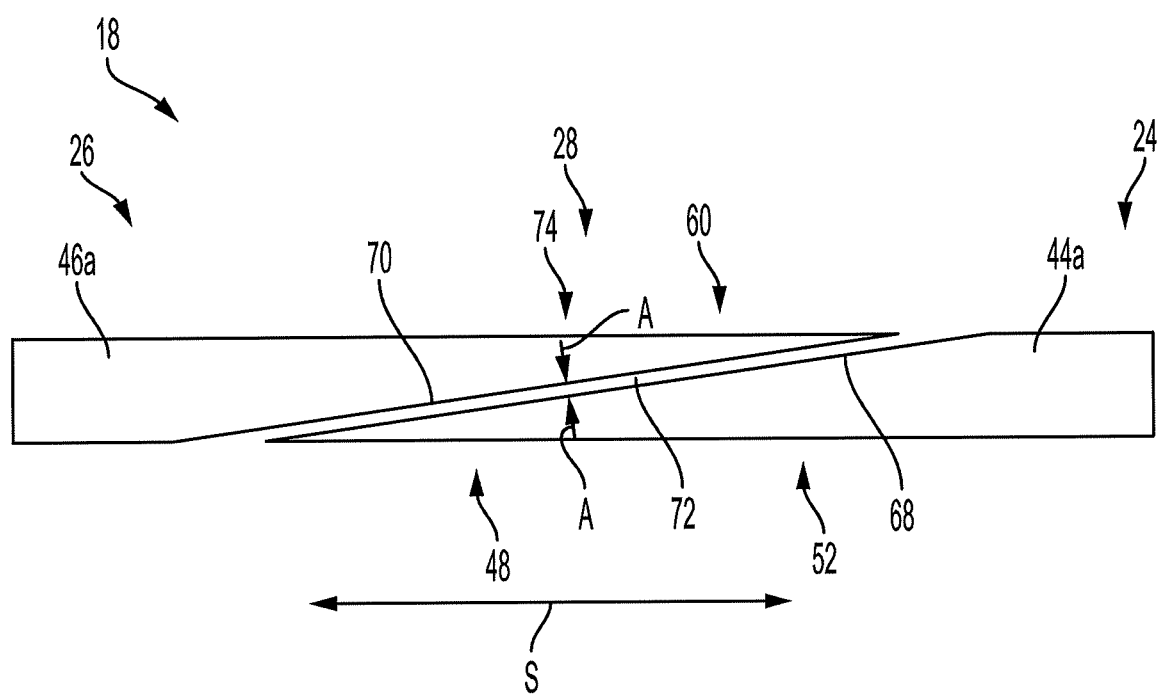
FIG. 5 is a schematic cross sectional representation of the tapered spar cap sections of the first and second blade modules forming a scarf joint in a joint region between the first and second modules.

FIG. 5 is a schematic cross section in a spanwise plane through the joint region 28 of the assembled modular blade 18 on one side of the blade 18 prior to injection of the adhesive 66. For ease of illustration, only the windward side 48 of the blade 18 is shown, though the leeward side 50 would have a corresponding arrangement (effectively a mirror image in a horizontal plane above FIG. 5). Only the tapered ends 52, 60 of the spar caps 44a, 46a are illustrated in this figure and the inner and outer skin layers 42a, 42b and 40a, 40b have been omitted. It can be seen that the scarfed surfaces 68, 70 of the first and second spar cap sections 44a, 46a are spaced slightly apart when the modules 24, 26 are aligned. The spacing between the scarfed surfaces 68, 70 (i.e. the mutual spacing perpendicular to the scarfed surfaces 68, 70) defines a bond gap 72, which is subsequently filled with adhesive 66 during the injection process. The size of the bond gap 72 is indicated in FIG. 5 by the distance between the opposed arrowheads A-A. The bond gap 72 defines the bond thickness of a scarf joint 74 when the modules 24, 26 are bonded together by the adhesive 66 that fills the bond gap 72. A corresponding bond gap is defined between the spar cap sections 44b, 46b of the leeward side.

A method of making blade modules 24, 26 in accordance with an embodiment of the invention will now be described with reference to FIGS. 6 to 11. The method allows the size of the bond gap 72 to be precisely controlled such that a required bond thickness can be achieved in the scarf joint 74.

Figure 6:
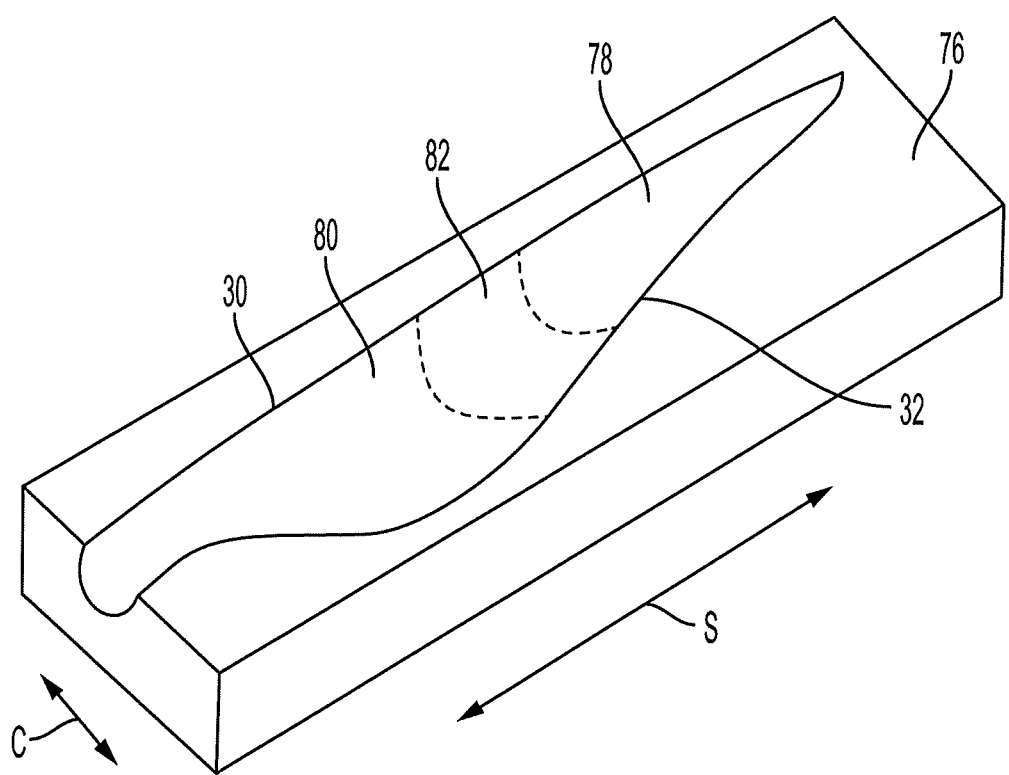
FIG. 6 is a schematic representation of a half mould for forming shell portions of the first and second blade modules.

Referring to FIG. 6, this schematically illustrates a first half mould 76 of a blade mould assembly for forming the first and second blade modules 24, 26 of the windward side 48 of the blade 18. The outer shells 36, 37 (shown in FIG. 2) of the blade modules 24, 26 may each be formed as separate half shells in respective first and second (windward and leeward) half moulds of the mould assembly. Once formed in their respective moulds, the half shells may be bonded together along their leading and trailing edges 30, 32 to form the complete blade modules 24, 26. In accordance with the present invention, both modules 24, 26 are formed in the same mould assembly, which may be a conventional wind turbine blade mould assembly of the same type used to form a conventional (i.e. non modular) blade. This advantageously allows existing mould tooling to be used to form a modular blade 18.

As shown in FIG. 6, the first (windward) half mould 76 comprises a first region 78, a second region 80 and a joint region 82 between the first and second regions 78, 80. The second half mould (not shown) similarly comprises these three regions, and may essentially be a mirror image of the first half mould 76.

The layup procedure for making windward half shells of the blade modules 24, 26 in the first half mould 76 will now be described with reference to FIGS. 7 to 10. For ease of illustration the lay-up procedure is depicted schematically in FIGS. 7 to 10 as a flat assembly, though the skilled person will understand that when assembled in a half mould 76 such as that of FIG. 6, the respective layers in the assembly would follow the contours of the mould 76. It will also be appreciated that a corresponding method may be used to form the leeward half shells for the leeward side 50 of the blade 18.

Figure 7A:
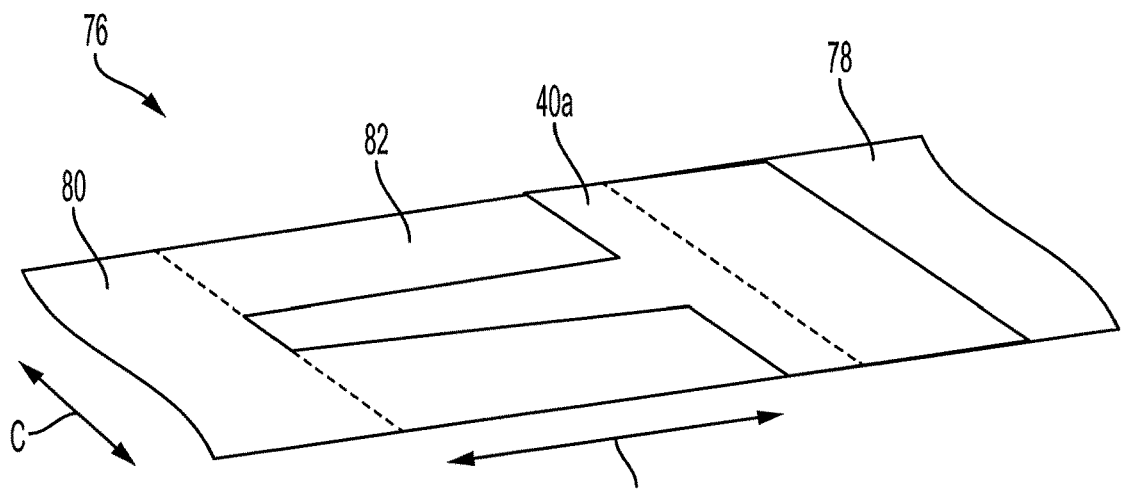
FIG. 7a schematically shows an outer skin layer of the first blade module.

FIG. 7a shows a first outer skin layer 40a of the first blade module 24 arranged in the first region 78 of the half mould 76. A section of the first outer skin layer 40a extends in a spanwise direction S into the joint region 82 of the half mould 76. The outer skin layer 40a may comprise one or more layers or plies of fibrous material, for example glass fibre. The plies may be dry or wet (e.g. prepreg).

Figure 7B:
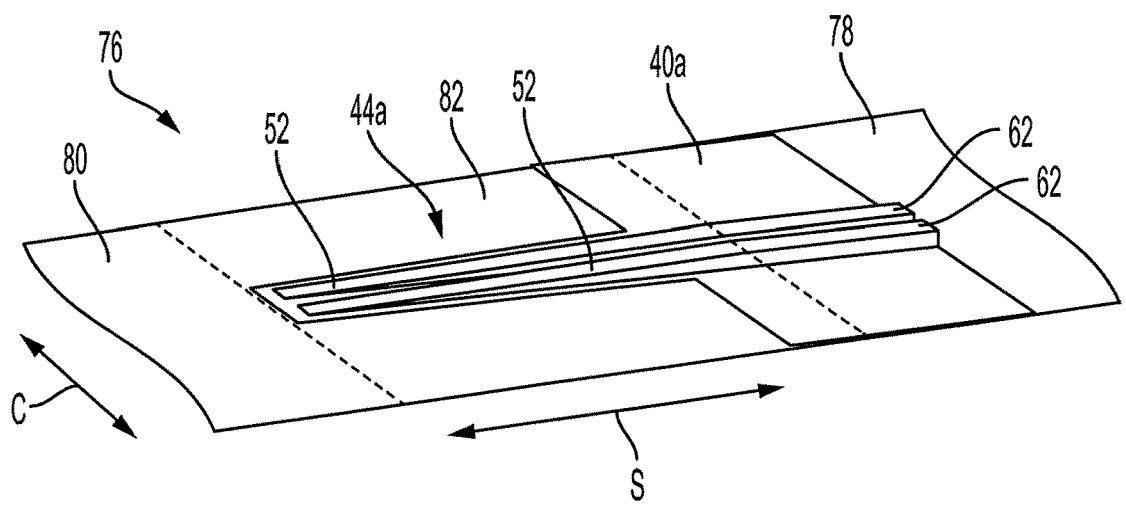
FIG. 7b schematically shows a pair of first spar cap sections with tapered ends arranged on top of the outer skin layer.

FIG. 7b shows the first spar cap section 44a of the first blade module 24 assembled on top of the first outer skin layer 40a. The first spar cap section 44a, as previously described, comprises a pair of side-by-side beams 62. The beams 62 are slightly spaced apart in the chordwise direction C. The beams have tapered end portions 52, which are arranged on top of the outer skin layer 40a in the joint region 82 of the mould 76. The remaining portions of the beams 62 extend in the spanwise direction S into the first region 78 of the mould 76. As discussed previously, the beams 62 may comprise a stack of pultruded strips arranged on top of each other in the mould 76. The strips may be assembled individually in the mould 76, in which case strips of different lengths may be used with their chordwise edges offset to form the taper 52. These edges may also be chamfered. Alternatively, the beams 62 may be prefabricated and arranged in the mould 76 as an integral unit.

Figure 7C:
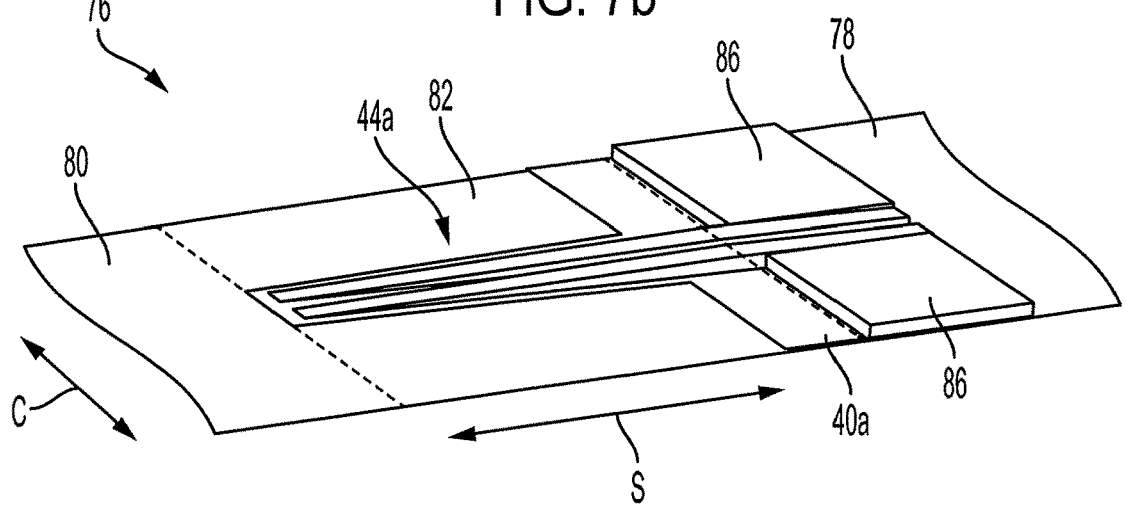
FIG. 7c schematically shows core material arranged adjacent to the spar cap sections on top of the outer skin layer.

FIG. 7c shows optional first core material 86 arranged on top of the first outer skin layer 40a in the first region 78 of the half mould 76. The core material 86 as previously described may comprise lightweight foam panels which add strength in regions of the shell 36 which require reinforcement. In this example, the first core material 86 is arranged adjacent to the spar cap section 44a and does not extend into the joint region 82 of the mould 76.

Figure 8A:
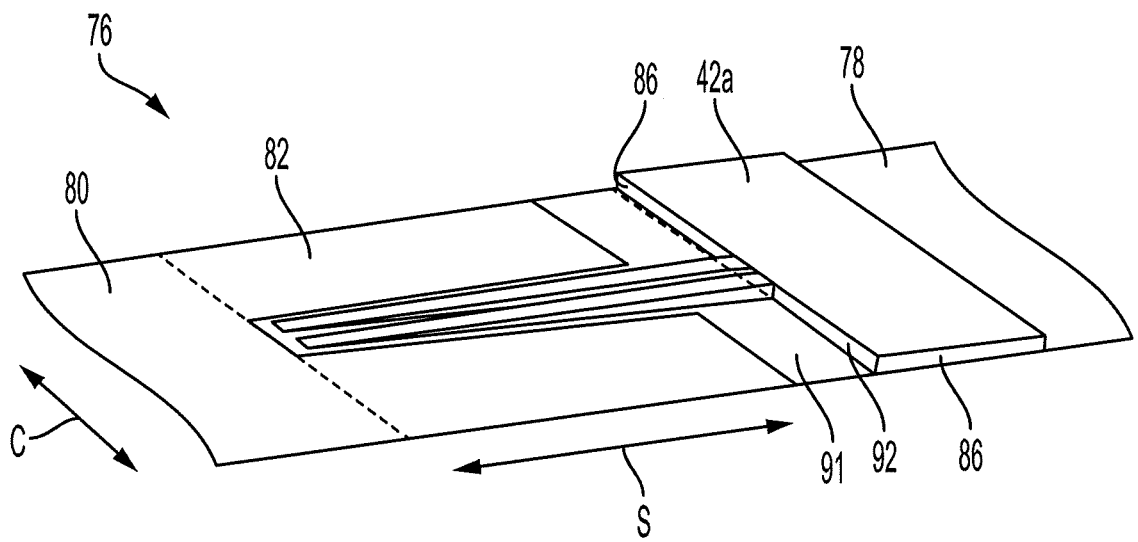
FIG. 8a schematically shows an optional inner skin layer arranged on top of the core material.

FIG. 8a shows an optional first inner skin layer 42a arranged on top of the first core material 86. The inner skin layer 42a may comprise one or more layers or plies of fibrous material, for example glass fibre. The plies may be dry or wet (e.g. prepreg).

Figure 8B:
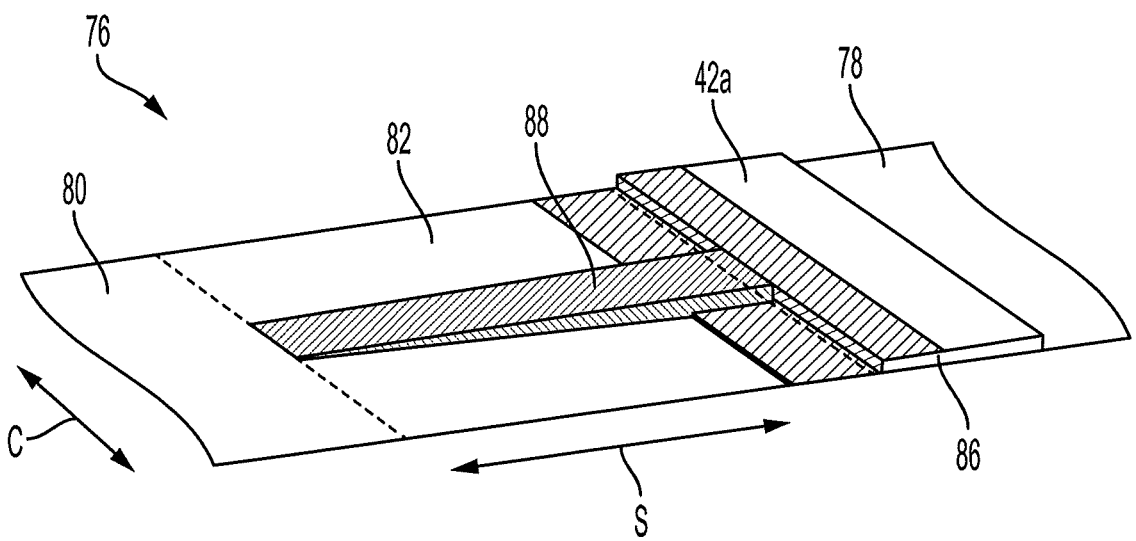
FIG. 8b schematically shows an optional peel ply layer arranged on top of the inner skin layer.

FIG. 8b shows a first optional sacrificial layer 88 arranged on top of parts of the previously laid-up materials in the joint region 82 and first region 78 of the mould 76. The sacrificial layer 88 in this example comprises a layer of peel ply. The peel ply 88 may be arranged to cover any parts of the module 24 that form bonding surfaces when the blade modules 24, 26 are bonded together. The peel ply 88 may be removed (peeled off) the finished blade module prior to bonding the modules together and results in a rough and more permeable surface to enhance the bond strength between blade modules.

Figure 9A:
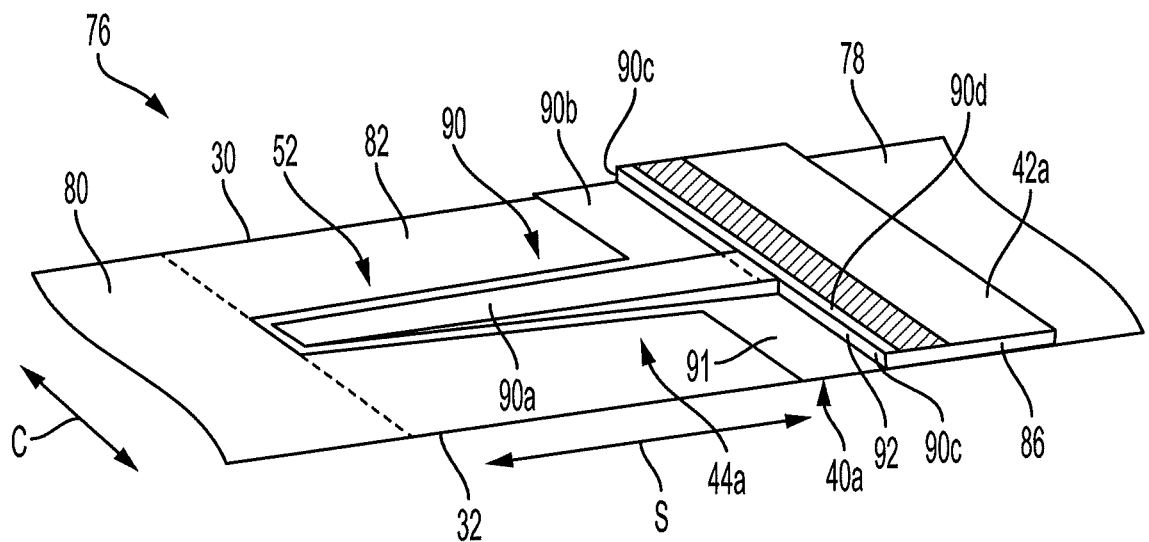
FIG. 9a schematically shows a separating layer arranged on top of the previously assembled parts in a joint region.

FIG. 9a shows a separating layer 90 arranged to cover the previously laid-up parts of the first blade module 24 in the joint region 82 of the mould 76. The separating layer 90 provides a barrier between the first and second blade module lay-ups in the mould 76. As will become evident, the separating layer 90 also advantageously sets the bond gap 72 (shown in FIG. 5) between the blade modules 24, 26. In particular, the thickness of the separating layer 90 is selected to correspond to a required bond thickness of the scarf joint 74 between the tapered end portions 52, 60 of the first and second spar cap sections 44a, 46a. In preferred embodiments the thickness of the separating layer 90 may be approximately 2-5 mm.

In this embodiment the separating layer 90 is advantageously a single moulded piece. However, in other embodiments, a plurality of separate separating layers may be used. The separating layer is preferably made from a non-stick material such as silicon or PTFE (Polytetrafluoroethylene) which facilitates release from a cured resin.

A first portion 90a of the separating layer 90 is arranged on top of the tapered end portion 52 of the first spar cap section 44a in the joint region 82 of the half mould 76. The first separating layer 90a is elongate and extends in a spanwise direction S covering the entire tapered end portion 52 of the first spar cap section 44a. A second portion 90b of the separating layer 90 is arranged in the joint region 82 of the mould 76 on top of an edge portion 91 (shown more clearly in FIG. 8a) of the first outer skin layer 40a. The second portion 90b of the separating layer 90 extends in a chordwise direction C of the blade 18 between the leading and trailing edges 30, 32 of the half mould 76. A third portion 90c of the separating layer 90 is arranged in the joint region 82 of the mould 76 such that it covers an end face 92 (shown more clearly in FIG. 8a) of the first core material 86. The third portion 90c of the separating layer 90 forms a step with the second portion 90b. A fourth portion 90d of the separating layer 90 overlaps a portion of the inner skin layer 42a in the first region 78 of the mould 76.

In other embodiments, a plurality of separate separating layers may be used instead of a single moulded layer 90. For example, the first 90a, second 90b, third 90c and/or fourth 90d portions of the separating layer 90 could be formed instead as individual separate layers. References in the accompanying claims to first, second, third and fourth separating layers 90a,b,c,d are therefore intended to cover these layers being either separate layers or integral portions of a separating layer 90 such as that shown by way of example in FIG. 9a.

Figure 9B:
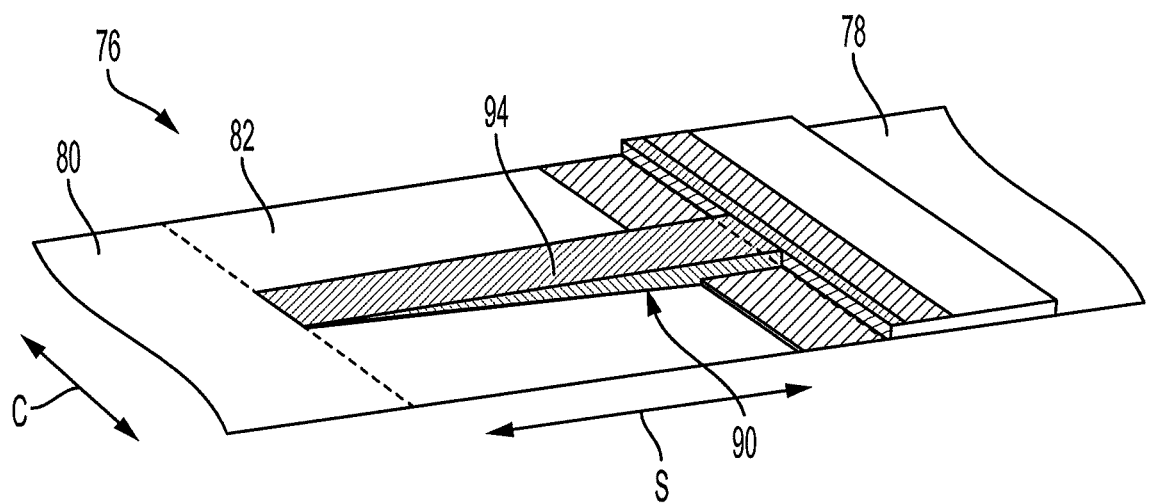
FIG. 9b schematically shows an optional peel ply layer arranged on top of the separating layer.

FIG. 9b shows the initial step in the lay-up procedure for the second blade module 26. As shown, a second (optional) sacrificial layer 94 is arranged on top of the separating layer 90 in the joint region 82 of the half mould 76. The sacrificial layer 94 in this example also extends partially into the first region 78 of the mould 76. In this example the sacrificial layer 94 is a peel-ply layer.

Figure 9C:
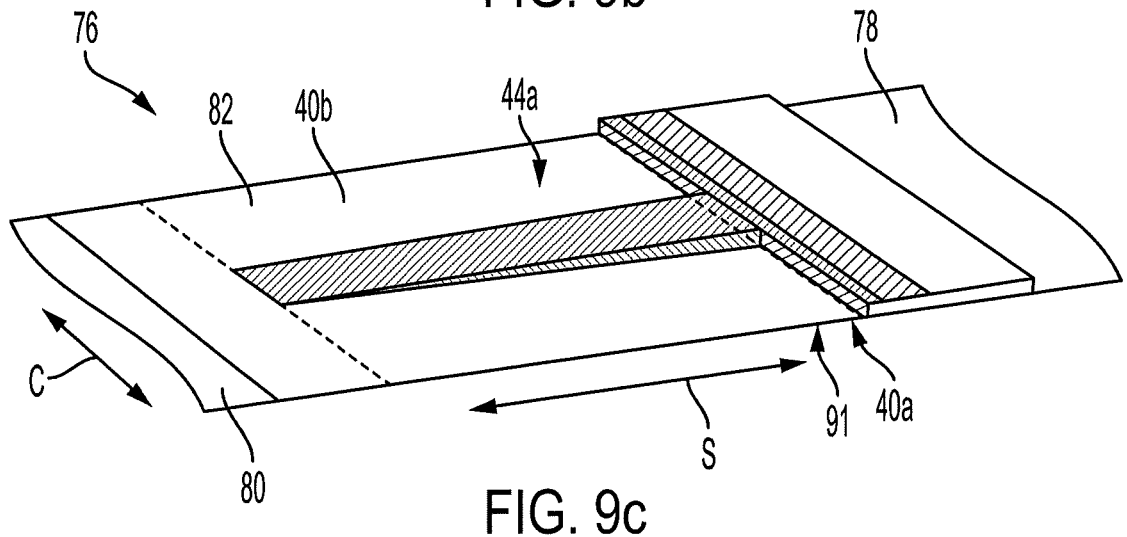
FIG. 9c schematically shows an outer skin layer of the second blade module overlapping the joint region.

FIG. 9c shows a second outer skin layer 40b of the second blade module 26 arranged in the second region 80 of the mould 76 and surrounding the first spar cap section 44a in the joint region 82 of the mould 76. The second outer skin layer 40b may comprise one or more layers or plies of fibrous material, for example glass fibre. The plies may be dry or wet (e.g. prepreg). The second outer skin layer 40b overlaps the edge region 91 of the first outer skin layer 40a in the joint region 82 of the mould 76, with the second portion 90b of the separating layer 90 (shown in FIG. 9a) there between.

Figure 10A:
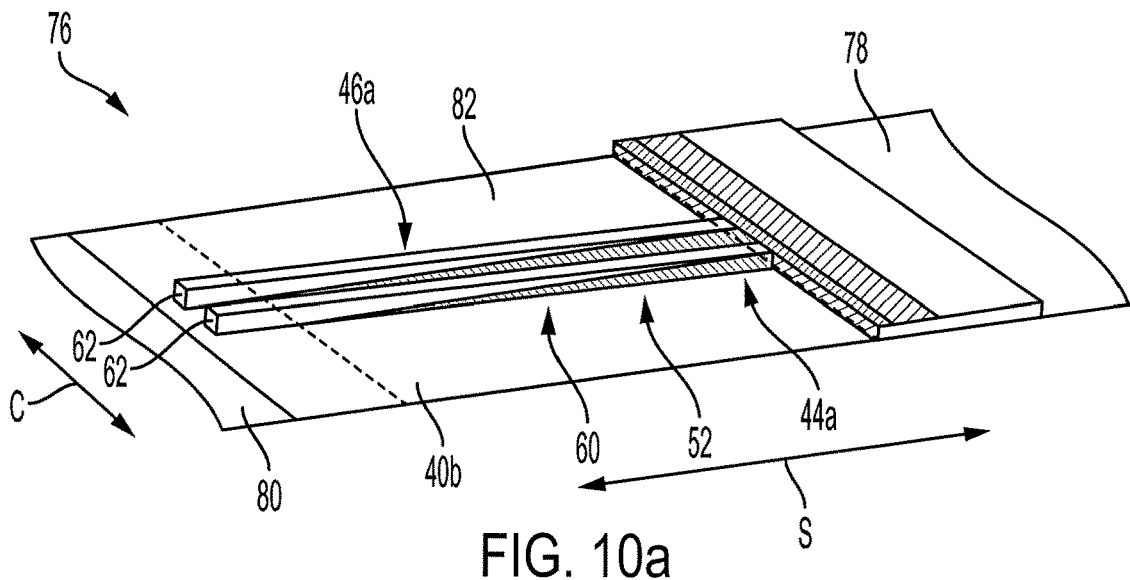

FIG. 10a shows the second spar cap section 46a arranged in the mould 76. In common with the first spar cap section 44a, the second spar cap section 46a comprises a pair of beams 62 that are slightly spaced apart in the chordwise direction C. The beams 62 have tapered end portions 60, which are arranged to overlap the tapered end portion 52 of the first spar cap section 44a in the joint region 82. The first portion 90a of the separating layer 90 (shown in FIG. 9a) is therefore sandwiched between the tapered end portions 52, 60 of the first and second spar cap sections 44a, 46a. A remainder of the second spar cap section 46a extends longitudinally into the second region 80 of the mould 76. The second spar cap section 46a may advantageously have a substantially identical composition to the first spar cap section 44a, e.g. the beams 62 may be made of CFRP pultrusions.

Figure 10B:
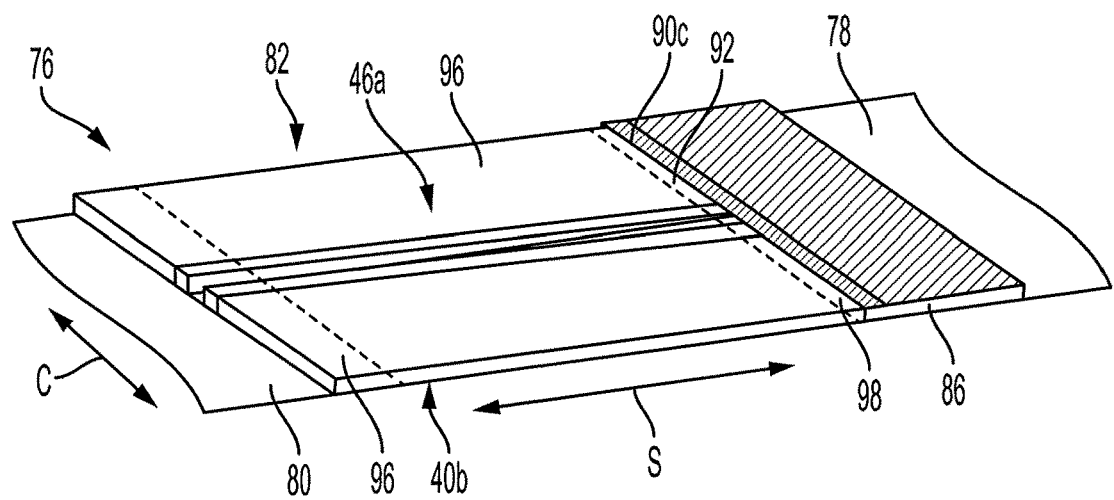
FIG. 10b schematically shows core material of the second blade module arranged adjacent to the second spar cap sections.

FIG. 10b shows optional second core material 96 arranged in the half mould 76 on top of the second outer skin layer 40b. The second core material 96 in this example is arranged in the joint region 82 of the mould 76 adjacent to the second spar cap section 46a. End faces 98 of the second core material 96 abut the third portion 90c of the separation layer 90 (shown more clearly in FIG. 9a). The third portion 90c of the separation layer 90 is therefore sandwiched between the opposed end faces 92, 98 of the first and second core material 86, 96.

Figure 10C:
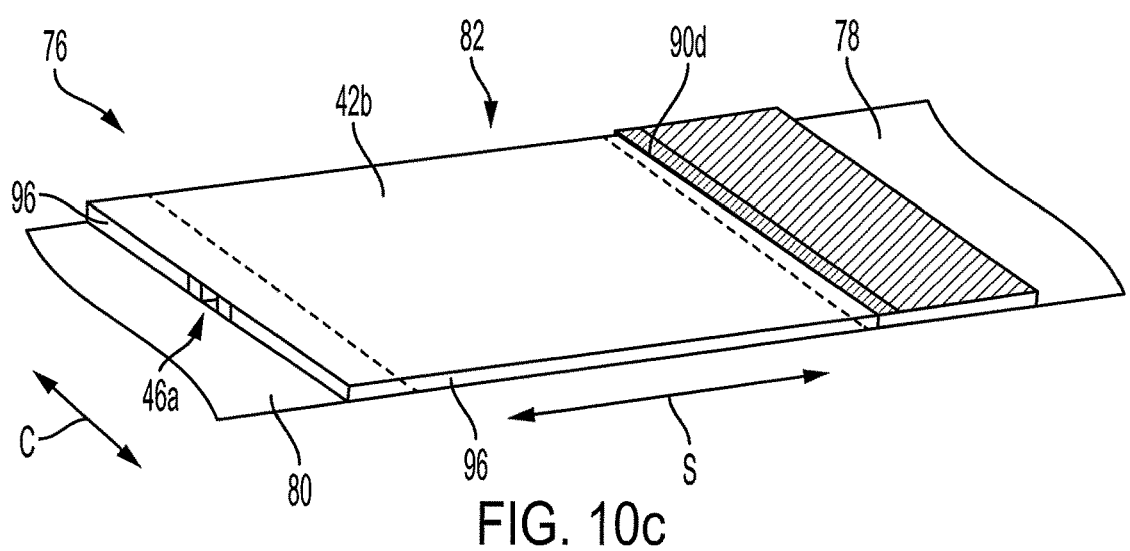
FIG. 10c shows an inner skin layer of the second blade module arranged on top of the spar cap sections and core material of the second blade module.

FIG. 10c shows an optional second inner skin layer 42b of the second blade module 26 arranged in the joint region 82 of the mould 76 on top of the second spar cap section 46a and on top of the second core material 96. The second inner skin layer 42b may comprise one or more layers or plies of fibrous material, for example glass fibre. The plies may be dry or wet (e.g. prepreg). The second inner skin layer 42*b* extends up to and may optionally overlap the fourth portion 90*d* (shown more clearly in FIG. 9*a*) of the separating layer 90. This completes the layup process for the first and second blade modules 24, 26.

Following completion of the lay-up procedure, the various layers may be integrated to form the first and second blade modules 24, 26. The integration process may comprise any suitable moulding processes, for example resin infusion, resin transfer moulding, prepreg moulding etc, which are familiar to persons skilled in the art of wind turbine blade manufacture. A typical resin infusion process may involve arranging a vacuum bag over the layups and sealing the vacuum bag against a surface of the mould 76 to form a sealed region encapsulating the layups. The sealed region may then be evacuated and resin may be admitted into the sealed region. The resin infuses between the various layers. The resin may then undergo a curing process whereby it hardens and solidifies to form finished half shells of the first and second blade modules 24, 26.

Following curing of the resin in each of the first and second half moulds, the second half mould may be arranged on top of the first half mould 76 and the half shells bonded together along their leading and trailing edges 30, 32. After curing of the bonding agent (e.g. adhesive), the complete first and second blade modules may be separated. The non-stick material of the separating layer 90 facilitates separation of the two modules 24, 26 and ensures that the modules do not become connected during the moulding process.

In the above method, the or each separating layer 90 may comprise perforations through the thickness of the separating layer 90. The diameter of the perforations may advantageously be in the region of 400 μm, however it will be appreciated by a person skilled in the art that a range of perforation diameters will be applicable with the same result, and the invention is not limited to a separating layer 90 with perforations of 400 μm diameter.

The perforations allow air to pass through the separation layer 90 in order to achieve an even and complete vacuum throughout the half mould 76 during the vacuum-bagging process, which optimises infusion of resin in the layups. During a resin infusion process the perforations may also allow a small amount of resin to pass through the separating layer 90 between first and second regions 78, 80 of the mould 76. The resin in the perforations may form brittle resin connecting bridges when the resin in the half mould 76 is cured. Due to the small diameter of the perforations, the brittle resin connecting bridges are easily broken when separating the first and second blade modules 24, 26.

The thickness of the separating layer 90 precisely defines the bond gap 72 (shown in FIG. 5) between the blade modules 24, 26 during the assembly process of the blade modules, and thus allows a well-defined bond thickness to be achieved, in particular between the scarf surfaces 68, 70 of the spar cap sections 44*a*, 46*a* and 44*b*, 46*b* in the scarf joint 74 (shown in FIG. 5). This allows a consistent and strong bond between the blade modules 24, 26 to be achieved. The use of the separating layer 90 further allows the blade modules 24, 26 to be formed in the same mould, which may be a mould that is also suitable for making conventional non-modular wind turbine blades.

Figure 11:
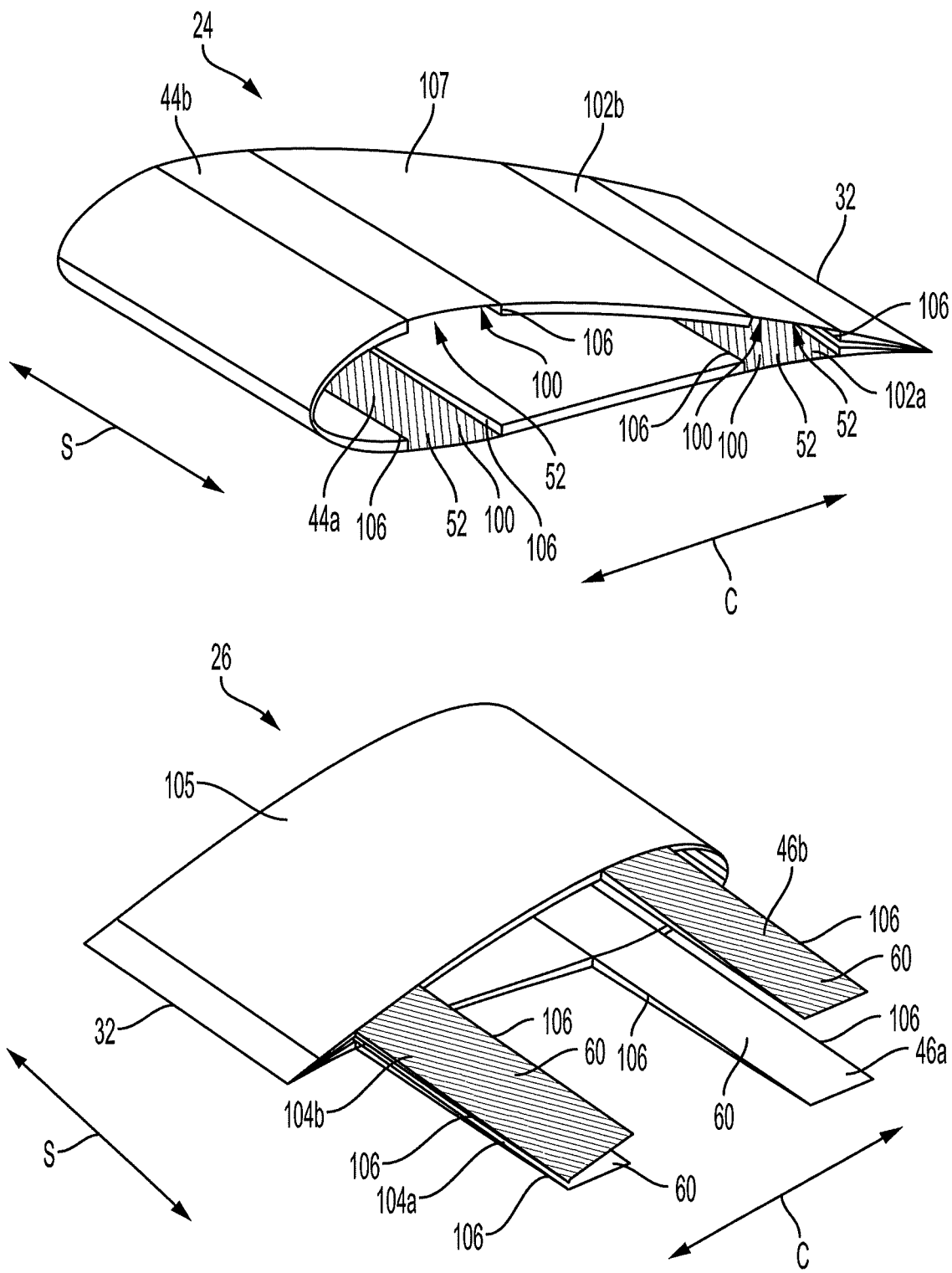
FIG. 11 shows first and second blade modules according to another embodiment of the present invention in which the first blade module defines tapered internal recesses for accommodating projecting tapered spar cap sections of the second blade module.

FIG. 11 shows first and second blade modules 24, 26 according to another embodiment of the present invention. In this example, the modules 24, 26 include a trailing edge spar cap 102*a*, 102*b* and 104*a*, 104*b* in addition to a main spar cap 44*a*, 44*b* and 46*a*, 46*b*. The trailing edge spar cap 102*a*, 102*b* and 104*a*, 104*b* provides additional reinforcement to the blade 18 at the trailing edge 32. It will be appreciated that the use of a single longitudinally extending spar cap in each half shell is also envisaged in combination with internal tapered recesses 100. Likewise, the previous embodiment may also include a trailing edge spar structure.

Also, in this example, the first blade module 24 includes internal tapered recesses 100 formed by tapered end portions 52 of first spar cap sections 44*a*, 44*b*, 102*a*, 102*b* of the first blade module 24. The second blade module 26 includes second spar cap sections 46*a*, 46*b*, 104*a*, 104*b* having tapered end portions 60 that project from its outer shell 105. The projecting tapered spar cap sections 46*a*, 46*b*, 104*a*, 104*b* of the second module 26 may be bonded in the tapered recesses 100 of the first module 24 to form scarf joints 74 between the spar cap sections 44*a* and 46*a*, 44*b* and 46*b*, 102*a* and 104*a*, 104*a* and 104*b* of the modules 24, 26.

In this example, the first blade module 24 preferably comprises an inboard portion of the blade 18, and more preferably also comprises the blade root 20. The second blade module 26 preferably comprises an outboard part of the blade 18, and more preferably comprises the blade tip 34. In this embodiment, and in the previous embodiment, the shell 107 of the inboard module 24 is typically longer than the shell 105 of the outboard module 26. It is preferable and advantageous, although not essential, for the projecting spar cap portions in the first embodiment and in the second embodiment, to project from the module 24 or 26 having a shorter shell in order to facilitate transportation and storage of the modules 24, 26. Therefore, the projecting tapered spar cap portions may preferably form part of a tip module.

The modular blade half shells of this embodiment are manufactured principally using the method described with reference to FIGS. 7-10 with some adjustments. In particular, the first module 24 in this example, which defines the internal recesses 100, is laid up in the mould 76 first. One or more separating layers 90 are then arranged on top of the tapered end portions 52 of the first spar cap sections 44*a*, 44*b*, 102*a*, 102*b* and on top of the other parts of the first module layup in the joint region 82 of the mould 76 (shown in FIGS. 7-10). The second module 26, including the projecting spar cap portions 46*a*, 46*b*, 104*a*, 104*b*, is then laid up on top of the separating layer 90.

The provision of internal recesses 100 is particularly advantageous in that it results in a split line between the modules 24, 26 at the outer surface of the assembled blade 18 that extends only a chordwise direction C. This minimises the area of the split line that is incident to oncoming airflow over the aerodynamic profile of the blade. By way of comparison, in the previous embodiment having external recesses 56, the split line also extends in the spanwise direction S, and hence presents a larger area of the joint 74 that it is incident to oncoming airflow. The use of internal recesses 100 therefore presents a more aerodynamically optimised outer profile of the blade.

The internal recesses 100 present a further advantage in that any adhesive 66 that may migrate outside the bond gap 72 along the edges of the spar caps during the assembly process would be contained in the interior 38 of the blade and not on the outer surface 41 of the blade 18. This may avoid or significantly reduce the need for any finishing operations such as sanding of the outer surface of the blade after the bonding process. In any embodiment the longitudinal edges 106 of the spar cap sections 44*a*, 44*b*, 46*a*, 46*b*, 102*a*, 102*b*, 104*a*, 104*b* may be chamfered to aid release of the first and second blade modules 24, 26 from a separating layer 90 during manufacture of the blade shells 105, 107.

Whilst shear webs are not shown in the figures for clarity, it will be appreciated that shear webs are preferably integrated with the blade modules 24, 26 of either embodiment. The shear webs are preferably arranged inside the modules and extend between opposed spar caps on opposite sides 48, 50 of the blade 18. The embodiment shown in FIG. 11 provides an advantage in this respect, in that the use of internal recesses 100 in one 24 module allows a shear web to be provided between the projecting tapered end portions 60 of the second spar cap sections 46a, 46b, 104a, 104b in the other module 26. This is particularly advantageous when transporting and handling the blade modules 24, 26 since the shear web supports the projecting spar cap sections 46a, 46b, 104a, 104b. In the embodiment of FIG. 11, the shear webs would also bridge the separating line between the shells 105, 107 of the blade modules 24, 26 and provide a more even load distribution across the joint region 28 between the first and second blade modules 24, 26.

The present invention resides in the use of a separating layer 90 having a thickness selected to correspond to a required bond thickness A-A between blade modules 24, 26.

The separating layer 90 allows multiple blade modules to be formed simultaneously in the same mould assembly. The modules 24, 26 are laid up such that parts of the modules overlap in the joint region 82 of the mould 76 with the separating layer 90 sandwiched in between. A single moulding process can be used to form both modules 24, 26. This results in an optimal fit between the blade modules 24, 26 when they are later assembled together on site, with the bond gap 72 between the modules being precisely defined and controlled by suitable selection of the dimensions of the separating layer 90 used in the moulding process. As a result, an optimal, consistent and well defined adhesive bond can be formed in accordance with the design specification of the blade 18.

In summary, a method of making a modular wind turbine blade 18 has been described. The modular blade 18 comprises first and second blade modules 24, 26 connected together by a scarf joint 74 between tapered spar caps 44a, 44b, 102a, 102b, and 46a, 46b, 104a, 104b of the respective blade modules 24, 26. According to the method, first and second blade modules 24, 26 are laid up in the same mould assembly 76. A separating layer 90 is arranged between the layups of the first and second module 24, 26 in a joint region 82 of the mould 76. The separating layer 90 has a thickness corresponding to a required bond thickness A-A in the scarf joint 74 when the modules 24, 26 are bonded together.

Many modifications may be made to the above examples without departing from the scope of the present invention as defined in the accompanying claims.

The invention claimed is:

1. A method of making first and second blade modules of a modular wind turbine blade, the first and second blade modules each having a spar cap section with a tapered end, and the modules being configured for connection end-to-end by an adhesively bonded scarf joint between the tapered end portions of respective spar cap sections of the blade modules, and the method comprising:

providing a blade mould having a first region, a second region and a joint region between the first and second regions;

arranging a first outer skin layer of fibrous material in the first region of the mould and in the joint region of the mould to form an outer skin of the first blade module;

arranging a first spar cap section having a tapered end portion on top of the first outer skin layer such that the tapered end portion is in the joint region of the mould and a remainder of the first spar cap section extends into the first region of the mould;

arranging a first separating layer on top of the tapered end portion of the first spar cap section in the joint region of the mould;

arranging a second outer skin layer of fibrous material in the second region of the mould to form an outer skin of the second blade module;

arranging a second spar cap section having a tapered end portion in the mould such that its tapered end portion overlaps the tapered end portion of the first spar cap section in the joint region of the mould with the first separating layer sandwiched there between, and such that a remainder of the second spar cap section extends into the second region of the mould and is on top of the second outer skin layer;

integrating the first outer skin layer with the first spar cap section to form a shell portion of the first blade module;

integrating the second outer skin layer with the second spar cap section to form a shell portion of the second blade module;

separating the shell portions of the first and second blade modules; and selecting a thickness of the first separating layer to correspond to a required bond thickness of the scarf joint between the tapered end portions of the first and second spar cap sections when the first and second modules are connected together to form the modular blade.

2. The method of claim 1, further comprising arranging part of the second outer skin layer around the tapered end portion of the first spar cap section in the joint region of the mould.

3. The method of claim 1, further comprising arranging a second separating layer such that it overlaps an edge portion of the first outer skin layer in the joint region of the mould, and wherein the second outer skin layer extends up to or overlaps the second separating layer.

4. The method of claim 3, wherein the first separating layer is elongate and extends in a spanwise direction of the mould and the second separating layer is elongate and extends in a chordwise direction of the mould.

5. The method of claim 3, wherein the second separating layer is integral with the first separating layer.

6. The method of claim 3, further comprising arranging peel ply in the mould in areas directly above and/or below the second separating layer.

7. The method of claim 3, wherein the second separating layer comprises perforations.

8. The method of claim 1, further comprising arranging first core material in the mould on top of the first outer skin layer and arranging a third separating layer in the joint region of the mould such that it covers an end face of the first core material.

9. The method of claim 8, further comprising arranging a second separating layer such that it overlaps an edge portion of the first outer skin layer in the joint region of the mould, wherein the second outer skin layer extends up to or overlaps the second separating layer, and wherein the third separating layer is integral with the second separating layer and forms a step with the second separating layer.

10. The method of claim 9, wherein the second separating layer is integral with the first separating layer.

11. The method of claim 8, wherein the method comprises arranging second core material in the mould on top of the second outer skin layer and wherein end faces of the second core material abut the third separating layer.

12. The method of claim 8, further comprising arranging peel ply in the mould in areas directly above and/or below the third separating layer.

13. The method of claim 8, wherein the third separating layer comprises perforations.

14. The method of claim 1, further comprising arranging a first inner skin layer of fibrous material on top of the first spar cap section to form an inner skin of the first blade module, and arranging a fourth separating layer in the mould such that it overlaps an edge portion of the first inner skin layer.

15. The method of claim 14, further comprising arranging a second inner skin layer of fibrous material on top of the second spar cap section to form an inner skin of the second blade module, and wherein the second inner skin layer extends up to or overlaps the fourth separating layer.

16. The method of claim 14, wherein the fourth separating layer is integral with the first separating layer.

17. The method of claim 1, further comprising arranging peel ply in the mould in areas directly above and/or below the first separating layer.

18. The method of claim 1, wherein the first separating layer comprises perforations.

19. The method of claim 1, wherein the first separating layer is made from a non-stick material.

20. The method of claim 1, wherein the first and/or second spar cap sections comprise at least two parallel spaced-apart beams.

\* \* \* \* \*